United States Patent Office 3,466,979
Patented Sept. 16, 1969

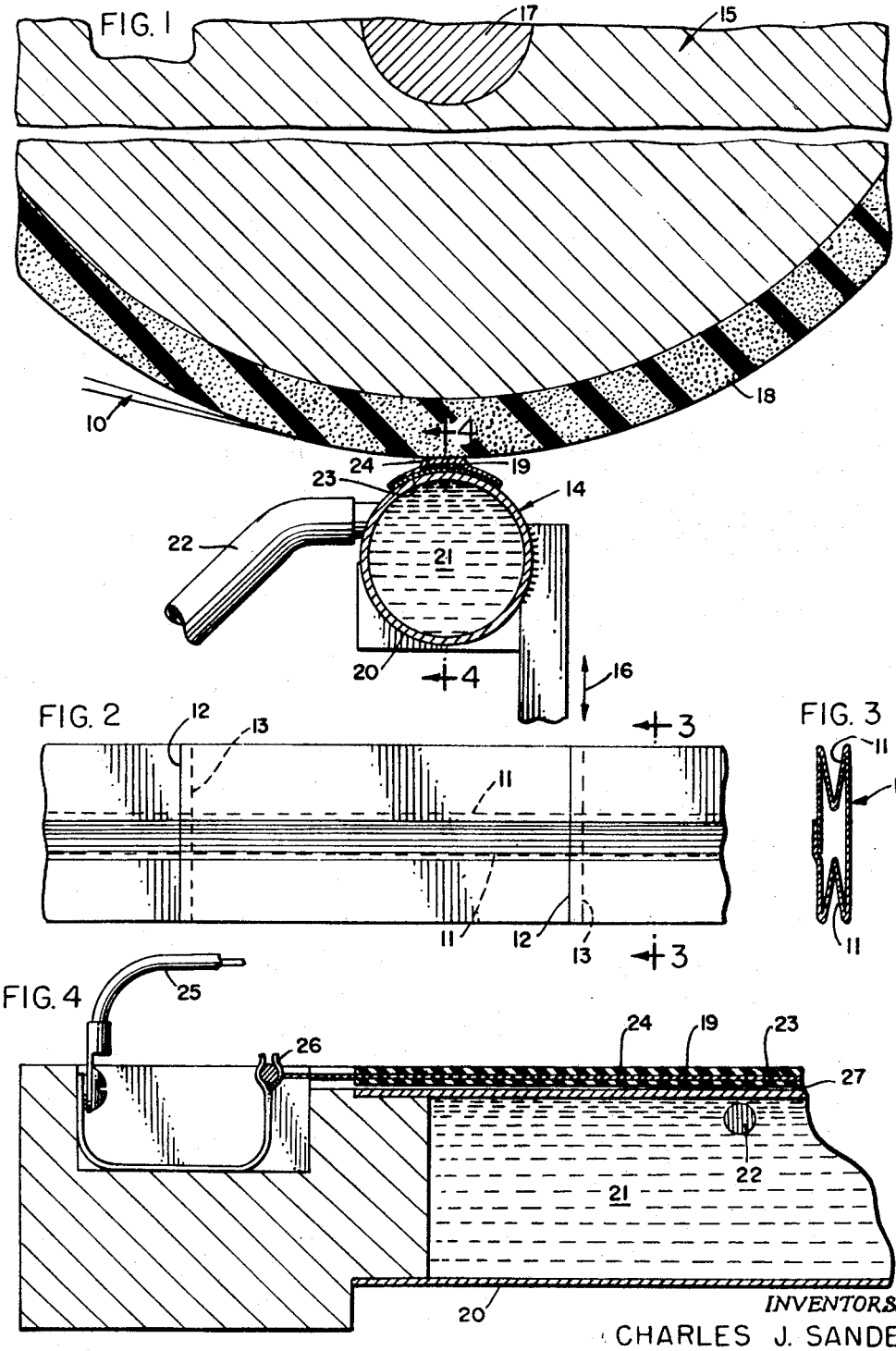

3,466,979
APPARATUS AND METHOD FOR TRANSVERSE HEAT-SEALING PLASTIC WEBBING
Charles J. Sanders, De Pere, and John R. Merkatoris, Green Bay, Wis., assignors to Paper Converting Machine Company, Inc., Green Bay, Wis., a corporation of Wisconsin
Filed May 8, 1967, Ser. No. 636,832
Int. Cl. B31b *1/00, 49/04;* B32b *31/00*
U.S. Cl. 93—8      7 Claims

ABSTRACT OF THE DISCLOSURE

Apparatus and method for transverse heat-sealing of plastic webbing wherein a continuously electrically energized ribbon is employed to unite the web portions without rupturing the same, the ribbon having a coolant adjacent to it for selective increased contact pressure with the ribbon incident to sealing so as to limit the heat transfer into the webbing.

---

The invention here constitutes an improvement on two previously-patented, coowned inventions set forth in United States Patent Nos. 3,107,585 and 3,221,613. The apparatus of the above-identified patents has performed successfully on plastic webbing such as polyethylene tubing having a wall thickness of the order of 0.00125" (1¼ mils). Thus, when tubing is transversely sealed, the sealing mechanism operates against a total thickness of 0.0025" (2½ mils). With greater thicknesses and higher speeds, the sealing apparatus was not entirely adequate. This was particularly true when the sides of the tubing were longitudinally folded to form gussets. In such an instance, the apparatus had to operate against four thicknesses in the vicinity of the longitudinal edges, or a total thickness of the order of 0.005" (5 mils). The particular problem encountered was that there was a tendency to sever rather than seal because of the heat requirements of different portions of the tubing. This problem has been solved by the instant invention—the provision of apparatus for this purpose constitutes an important object of the invention.

Another object of the invention is to provide a method and apparatus using a novelly-cooled sealing unit wherein the latter is continually electrically energized and adapted to be brought into intermittent and resilient contact with the tubing to be sealed.

Other objects and advantages of the invention may be seen in the details of construction and operation set down in the following specification.

The invention is described in conjunction with an illustrative embodiment in the accompanying drawing, in which:

FIG. 1 is a fragmentary sectional view of apparatus embodying the teachings of the invention;

FIG. 2 is a fragmentary plan view of the plastic webbing sealed by the apparatus of FIG. 1;

FIG. 3 is a transverse sectional view taken along the line 3—3 of FIG. 1; and

FIG. 4 is an enlarged fragmentary sectional view taken along the line 4—4 of FIG. 1.

Referring first to FIGS. 2 and 3, the tubular web 10 is seen to have side gussets as at 11 provided by longitudinally folding the web on itself. The invention is concerned with the provision of transverse heat seals as at 12 so as to provide ultimately a roll of end-connected bags which can be sequentially detached by virtue of lines of weakness or perforations as at 13 (still referred to FIG. 2). Bags of this general nature are currently available commercially and the lines of weakness 13 define the bottom of a first or given bag and the top of the next bag in succession. The invention is concerned with the development of the transverse seal 12.

For this purpose, we provide a frame (not shown) which supports a sealing element generally designated 14 and a backing element generally designated 15 for relative movement toward and away from each other (as indicated by the arrow 16). The alternate position of the element 14 is shown in dotted line and designated 14'. Additionally, the frame provides means for passing a web 10 between the elements 14 and 15.

The above-mentioned passage of the web 10 is advantageously achieved in the illustration given by shaping the element 15 in the form of the bedroll about which the web 10 is partially wrapped so as to travel with and on the bedroll. In FIG. 1, the bedroll constitutes the supporting element 15 and is seen to be equipped with a cross-shaft 17 for rotatable support. Additionally, the supporting element or bedroll 15 is equipped with an exterior periphery or layer of resilient material 18 which optimally may be a rubber coating.

The actual sealing is achieved through a heated ribbon 19 which has its length arranged transverse of the web 10. The ribbon is supported on a tubular member 20 filled with a cooling fluid as at 21. Piping designated 22 delivers and removes cooling fluid from the tubular support member 20.

The ribbon 19 is supported above the surface of the member 20 with a layer of thermal and electrical insulating tape such as Teflon interposed as at 23. Also, the outer surface of the ribbon 19 is covered by a tape as at 24.

In the operation of the apparatus it has been found that the apparatus is virtually insensitive to operating rate—that is the number of seals per minute does not affect the performance, the voltage on the ribbon to heat it remaining substantially constant. For this purpose, current is advantageously supplied to the ribbon 19 through lead 25 (see FIG. 4) which is clipped to an end of the ribbon as at 26. Further details of this construction can be seen in the above-mentioned Patent No. 3,221,613.

When no webbing is being sealed, the ribbon 19 is relatively free of the cooled support (see the space designated 27 in FIG. 4) and, as a consequence, the electrical current flowing through the ribbon 19 causes the ribbon to rapidly heat to a desired sealing temperature. When the webbing 10 is resiliently urged against the ribbon 19 by virtue of relative movement between the elements 14 and 15, the heat in the ribbon 19 seals the web 10 but at the same time the contact pressure drives the ribbon 19 into superior heat transfer contact with the coolant supplied support 20. As a result, the temperature of the ribbon 19 is decreased somewhat so as to preclude the introduction of that amount of heat into the tubing which would sever the same. In other words, the coolant 21 removes enough of the heat so that the ribbon temperature does not stay sufficiently high during the contact period to literally "burn through" the webbing 10.

A specific example of the invention which may facilitate understanding of the operation thereof, employs a ribbon commercially available as Nichrome V (80% nickel, 20% chromium manufactured by Driver-Harris Company). The ribbon employed was 0.005" thick, 0.065" wide and 12¾" long. The ribbon was arched slightly in the transverse direction to provide a "crowning" effect. The resistance of the ribbon was 1.4 ohms per foot and the voltage employed for sealing varied from between 16 volts to 20 volts. The Teflon tape used to envelope the ribbon was 0.003" thick, one thickness being used between the tubular support 20 and one thickness above the ribbon. A double thickness ½" wide was used along both longitudinal edges to develop a pocket for the ribbon 19.

The covering of the bedroll 18 was ½" thick rubber having a 45-48 durometer reading. The relative motion between the polyethylene webbing 10, ribbon and bedroll is zero during the sealing period. The minimum time employed for sealing was ⅙ second and a pressure of 5 lbs. per lineal inch was employed. The coolant 21 was water from the metropolitan mains having a temperature in the range 40-50° F., the flow rate being about 0.2 g.p.m. There was no measurable difference between the temperature of the water entering and that leaving.

A number of advantages accrue from the practice of the invention. By maintaining a constant flow of current through the sealing ribbon 19, there is avoided the extremes of expansion and contraction which are present when impulse-type operation is employed. The impulse-type operation results in a cycling of the temperature over a considerable range with the attendant mechanical working tending to result in wear not only in the ribbon but in component parts of the assembly. Additionally, as pointed out previously, there is an advantageous "insensitivity" of the apparatus to length of contact, i.e., time. This has resulted in the ability to transversely-seal plastic webbing at much higher speeds. In this connection, it will be appreciated that the invention can be practiced either by having the sealing element 14 move toward the supporting element 15 or vice versa. Further, both elements may be moved laterally to provide a continuous rather than an intermittent operation. In other words, following the teachings of the earlier-mentioned patents, moving chains can be employed for supporting the elements so as to cause the sealing to be performed with respect to a moving web. In any event, the supporting element 15 resiliently urges the sealing ribbon 19 into more intimate contact with the coolant-providing member 20 so as to limit the amount of heat transferred into the webbing 10. It will be appreciated that the superior contact afforded by bringing the elements 14 and 15 together rapidly reduces the temperature by the flow of heat both into the coolant 21 and into the tubing 10. Also, we have found that because of the relative insensitivity of the arrangement to time, not only can the sealing be performed faster than was available heretofore, but also at a wide variety of speeds without the need for adjusting the voltage which was a drawback of prior art techniques.

While in the foregoing specification a detailed description of an embodiment of the invention is set down for the purpose of explanation, many variations in the details hereingiven may be made by those skilled in the art without departing from the spirit and scope of the invention.

We claim:
1. In apparatus for heat-sealing superposed layers of plastic webbing, the combination comprising backing means supporting said webbing, a sealing ribbon adapted for selective engagement with said webbing against said backing means and electrically energized to a temperature sufficient to seal said webbing during said engagement, heat-conductive cooling means having a surface maintained at a temperature below the temperature of said ribbon and located adjacent thereto, and means for bringing said surface of said cooling means into contact with said ribbon after said ribbon has effected a seal thereby to cool said ribbon and prevent severing of said webbing.

2. The apparatus of claim 1 wherein said ribbon comprises an electrically conductive wire continuously coupled to a source of electricity, and a thin layer of nonconductive release material covering said wire to prevent the same from contacting said webbing.

3. The apparatus of claim 2 wherein said backing means includes a member of resilient material supporting said webbing during sealing.

4. The apparatus of claim 2 wherein said ribbon is transversely arched to define a convex surface for engaging said webbing thereby to provide a crown in said seal.

5. A method of sequentially heat-sealing superposed layers of thermoplastic webbing comprising electrically heating a heat-sealing ribbon to a temperature for developing transverse heat seals in said webbing, contacting said webbing with said ribbon to effect the seal, and then contacting said ribbon with a heat-conductive medium to abruptly reduce the temperature thereof and prevent severing of said web.

6. The method of claim 5 characterized by the step of moving both said ribbon and said heat-conductive medium together toward said webbing, the engagement of said ribbon and said webbing retarding the motion of said ribbon to thereby bring said heat conductive medium into engagement with said ribbon immediately after said ribbon has effected a seal.

7. The method of claim 6 further comprising the step of supporting said webbing with resilient means during contact by said ribbon.

References Cited

UNITED STATES PATENTS

| | | | |
|---|---|---|---|
| 3,221,613 | 12/1965 | Saners | 93—8 |
| 2,725,091 | 11/1955 | Miner et al. | 156—498 |
| 3,352,214 | 11/1967 | McColgan | 93—35 |

BERNARD STICKNEY, Primary Examiner

U.S. Cl. X.R.

93—35; 156—498, 583